United States Patent [19]
Hansen et al.

[11] 3,955,366
[45] May 11, 1976

[54] TORQUE CONVERTER POWER CAPACITY VARYING MEANS

[75] Inventors: Robert C. Hansen; Lowell E. Johnson, both of East Peoria, Ill.

[73] Assignee: Caterpillar Tractor Co., Peoria, Ill.

[22] Filed: Nov. 1, 1974

[21] Appl. No.: 519,984

[52] U.S. Cl.................................. 60/347; 415/141
[51] Int. Cl.².......................................... F16D 33/04
[58] Field of Search ............ 60/342, 347, 357, 364, 60/334, 349, 352, 354, 355, 356, 361; 415/141, 140, 130, 129

[56] References Cited
UNITED STATES PATENTS

| | | | |
|---|---|---|---|
| 2,122,169 | 6/1938 | Wilson | 60/356 |
| 2,440,445 | 4/1948 | Jandasek | 60/355 X |
| 3,151,457 | 10/1964 | Jandasek | 60/354 |

*Primary Examiner*—Edgar W. Geoghegan
*Attorney, Agent, or Firm*—Phillips, Moore, Weissenberger Lempio & Strabala

[57] ABSTRACT

A hydrodynamic torque converter is provided with means for varying the torque capacity of the torque converter, including means for varying the capacity of the impeller. The capacity of the impeller is varied by means of movable impeller blades which are movable radially outward to vary the radius of the respective blades.

6 Claims, 6 Drawing Figures

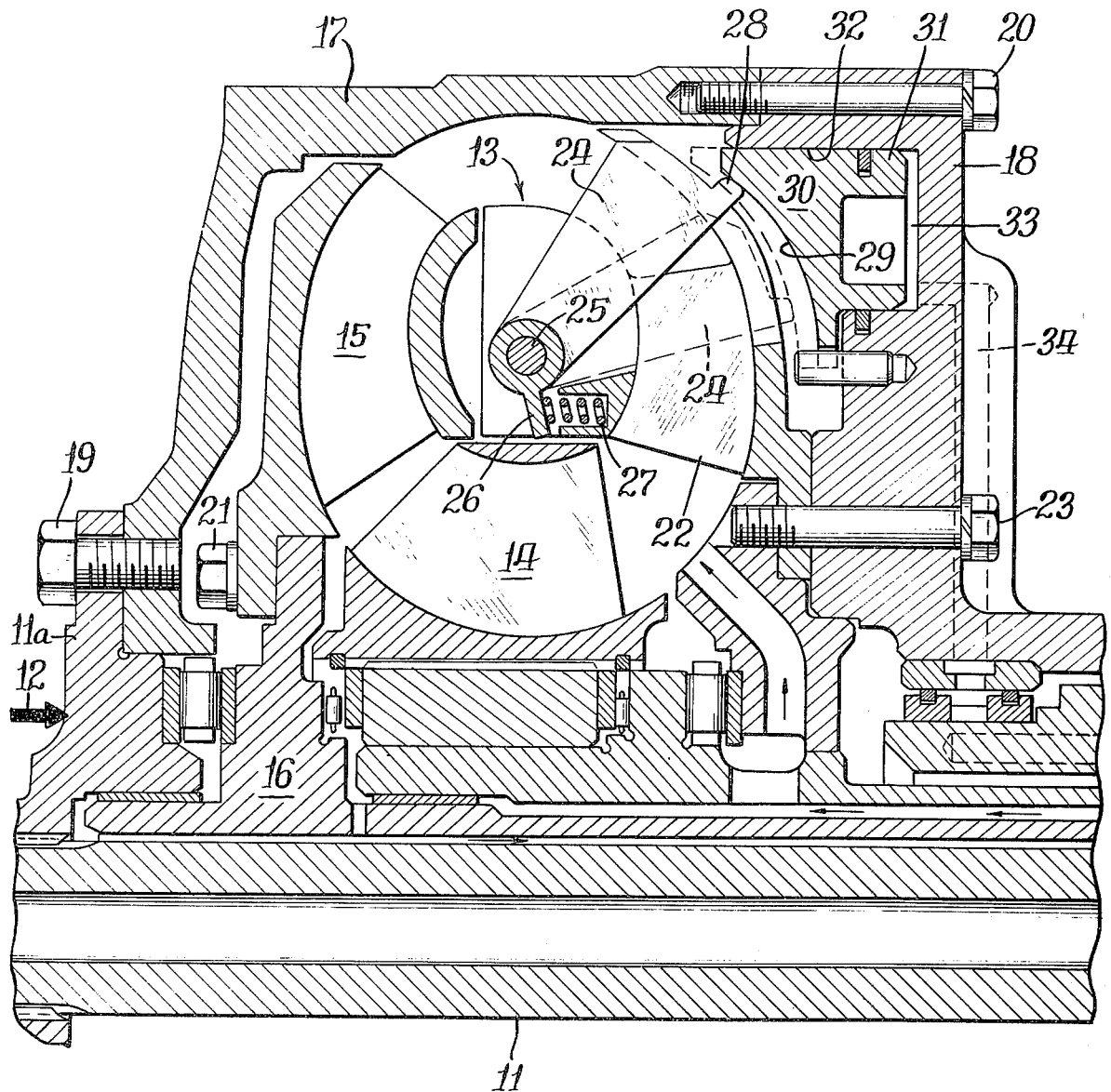
Fig_3_

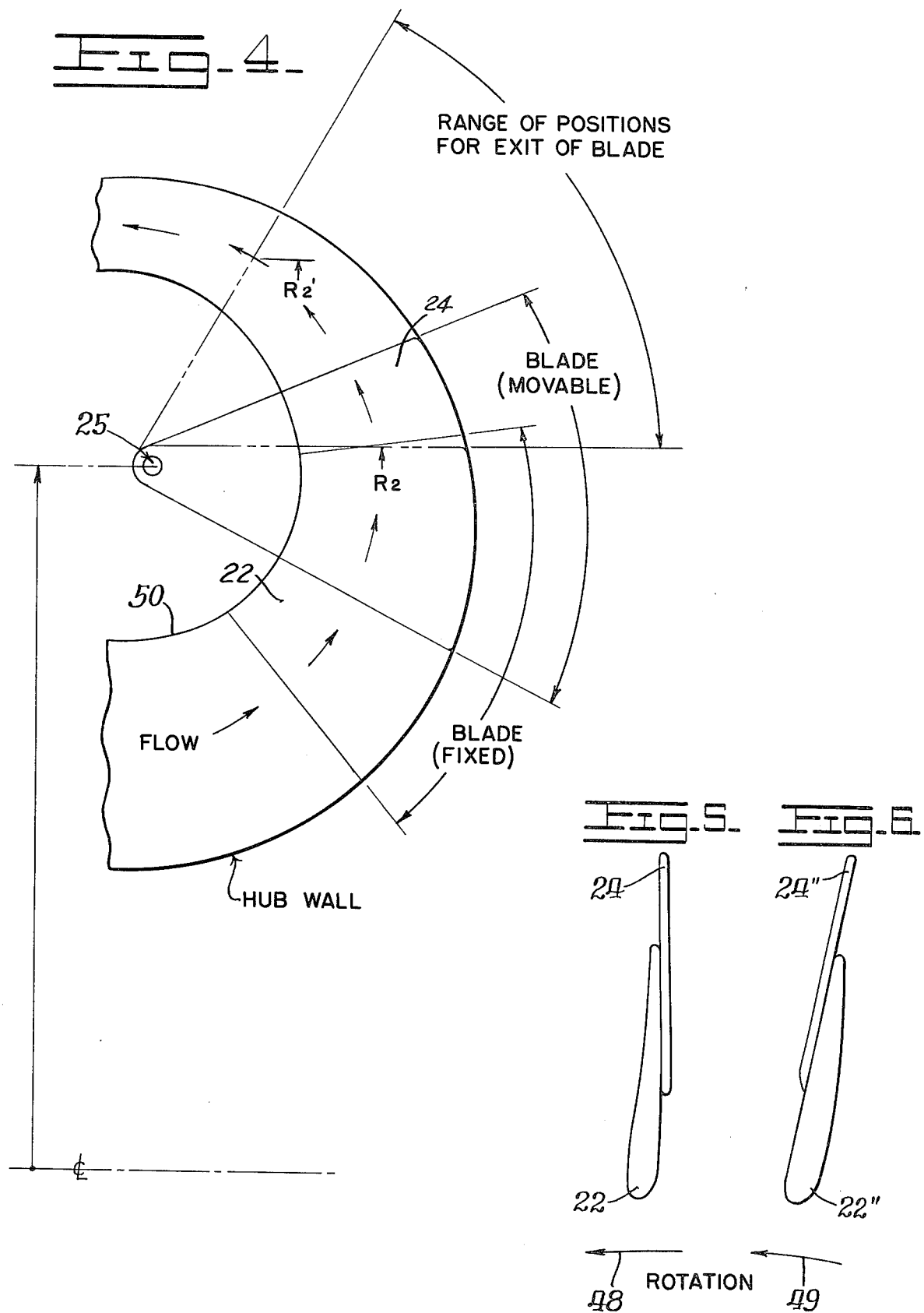

TORQUE CONVERTER POWER CAPACITY VARYING MEANS

BACKGROUND OF THE INVENTION

The present invention relates to torque converters and pertains particularly to means for varying the capacity of the torque converter.

In the application of hydrodynamic torque converters to heavy-duty vehicle power trains it is often advantageous to be able to modify the basic power absorption and transmission capacity of the unit. This is especially desirable on machines having powered implements which are operated by power from the vehicle engine. In such machines it is often desirable to vary the proportion of power delivered to the implements and that delivered to the vehicle power train.

In many machines, such as front-end loaders, for example, the combined power demands on the engine from both the loaders', hydraulic pump and the power train can exceed the power available from the engine. This often results in excessive engine lugging and unsatisfactory performance of both the machine and the implement or loader bucket.

One approach to this problem has been the use of a slipping clutch. The clutch is disposed within the drive train to reduce the torque load imposed by the drive train. This approach is shown, for example, in U.S. Pat. No. 3,424,029 issued to J. Horsch et al on Jan. 28, 1969, and U.S. Pat. No. 3,478,621 issued to L. E. Johnson et al on Nov. 18, 1969, both of which are assigned to the assignee hereof. One problem with this approach is the short life that would normally exist in such a clutch under heavy working conditions -- that is, under conditions where the clutch is allowed to slip a considerable amount of time.

Another approach to this problem has been the use of variable pitch blades in the torque converter, particularly the stator blades of the torque converter. These systems, however, require complicated controls and mechanisms for the converter.

ASSEMBLY AND OBJECTS OF THE INVENTION

It is a primary object of the present invention to provide means for varying the torque capacity of a torque converter.

Another object of the present invention is to provide means for varying the torque capacity of a torque converter whereby the engine load of a machine may be more evenly distributed between the drive train load and the implement load.

A further object of the present invention is to provide simple and inexpensive means for varying the torque capacity of a torque converter by varying the capacity of the impeller means.

In accordance with the primary aspect of the present invention the torque capacity of a torque converter is made variable by providing a variable impeller having variable capacity. The impeller includes means to vary the exit radius of the impeller to thereby vary the capacity thereof.

BRIEF DESCRIPTION OF THE DRAWING

The above and other objects and advantages of the present invention will become apparent from the following description when taken in conjunction with the accompanying drawings wherein:

FIG. 3 is a fragmentary elevational view in section showing details of the torque converter of the embodiment of FIG. 1;

FIG. 4 is a fragmentary view in elevation showing the details of the variable impeller blade of the embodiment of FIG. 3;

FIG. 5 is an end view of a preferred embodiment of the impeller of FIG. 4;

FIG. 6 is a view like FIG. 5 of an alternate embodiment of the impeller.

DETAILED DESCRIPTION OF PREFERRED EMBODIMENTS

Figure 1:
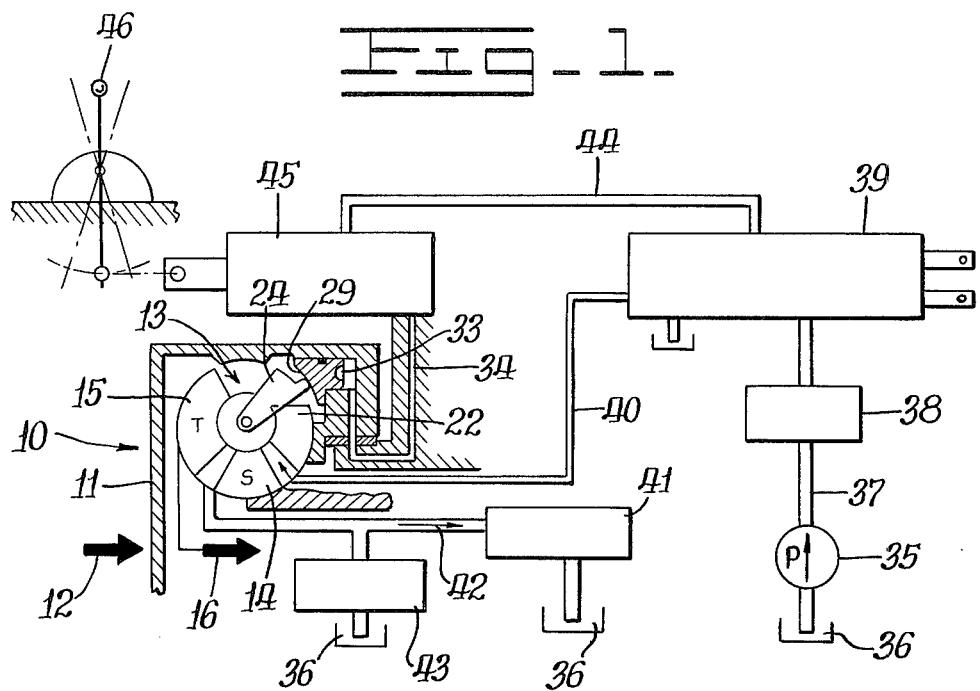
FIG. 1 is a schematic layout of a torque converter incorporating the present invention.
Figure 2:
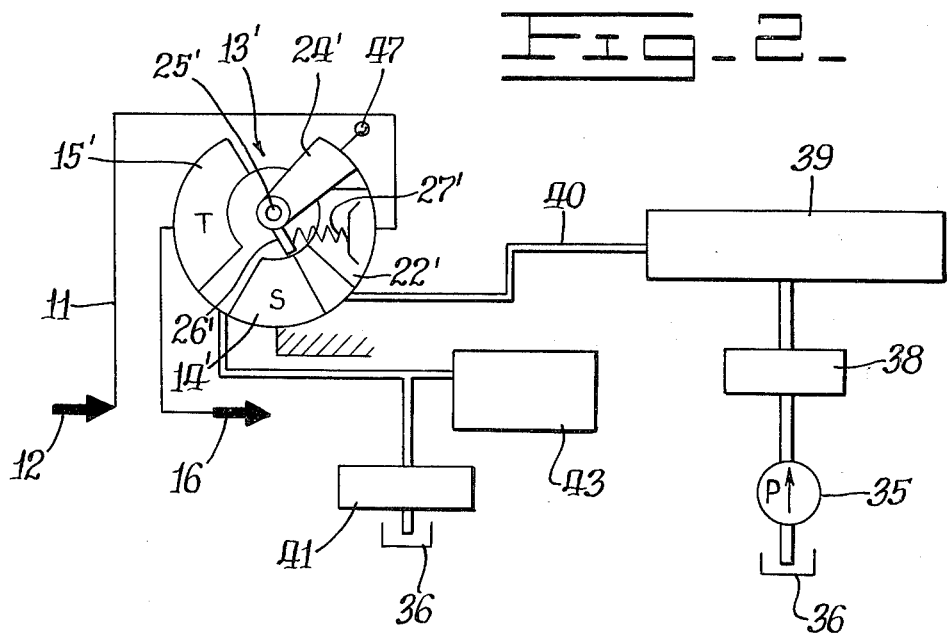
FIG. 2 is a schematic layout of an alternate embodiment of the present invention.

Referring now to FIGS. 1 and 2 of the drawing, the preferred embodiment of the invention is illustrated in a torque converter indicated generally at 10. The torque converter includes a power input member 11 coupled in the usual manner to a prime mover indicated generally at 12. The input member 11 is coupled to impeller means indicated generally at 13 which is operative in combination with a stator 14 and a turbine 15 for transmitting power through the torque converter. The turbine 15 is coupled in the usual manner to output means 16 which may be a suitable drive shaft or the like.

The stator 14 is preferably mounted in the usual manner such as on a stationary shaft or the like by means of a one-way brake or the like to permit rotation in one direction if desired.

As best seen in FIG. 3 the power input means includes a shaft 11 coupled by means of an input member 11a to an impeller housing comprising a first housing member 17 and a second housing member 18 for enclosing the components of the converter and rotating with the power input means. The first housing member 17 is connected in a suitable manner, such as by means of a plurality of bolts 19, to the input means 11a. The second housing member 18 is connected in a suitable manner, such as by means of bolts 20, to the first housing member 17. The turbine means or member 15 is connected in a suitable manner, such as by means of bolts 21, to the power output means 16 which may be a suitable power output shaft such as a tubular shaft concentrically mounted with respect to the input shaft 11.

The impeller means indicated generally at 13 comprises a first fixed impeller element or member 22 coupled in a suitable manner, such as by means of a plurality of bolts 23, to the housing member 18. A second impeller member 24 is pivotally mounted by a suitable pivoted means 25 to the first impeller member 22. As can be seen, the impeller members 22 and 24 are mounted a substantial radial distance outward from the rotary axis of the input means or shaft 11. The movable impeller member 24 includes a suitable arm 26 which is engaged by a suitable spring means 27, such as a compression spring, which is suitably compressed between the member 26 and the first impeller member 22 for biasing or rotating the movable impeller member 24 about its pivot axis 25 to a retracted or inward position as shown in phantom in FIG. 3.

Suitable stop means are provided for the movable member 24 to determine or establish its outermost position. The stop means includes a projection 28 extending radially outward of member 24 for engaging an arcuate face 29 of a movable stop member 30. The arcuate face 29 may have a variable radius or it may be a fixed radius having its axis offset to the right of the pivot axis 25 of the member 24. The member 30, designated as a movable stop member, includes piston means 31 reciprocally disposed in a suitable cylindrical bore 32 in housing member 18 and defining a chamber 33. Suitable pressurized control fluid is introduced into chamber 33 by means of suitable conduit or passageway means 34. Such pressurized fluid is operative to pressurize chamber 33 and move piston 31 outward to the left, as viewed in FIG. 3, to establish the stop position of the movable impeller member 24, the outward position of the piston 31 and stop member 30 being dependent upon the pressure introduced within chamber 33.

Referring back to FIG. 1, there is illustrated a control system for operating the second impeller element of the torque converter. This control means comprises a suitable source of pressurized fluid, such as a pump 35 delivering pressurized fluid from a sump 36 by means of conduit means 37 including filters 38 to a transmission control valve 39. The transmission control means 39 includes suitable valve means for directing fluid by means of conduit means 40 to the interior of the torque converter, which fluid is circulated therethrough and through a cooler 41 by conduit means 42 which also includes suitable outlet relief valves 43.

For control of the capacity variable means, control fluid is directed from the transmission control means by way of suitable control valves such as a manual reducing valve 45 by way of conduit 44 for acting along conduit 34 to operate the variable stop means for the movable impeller member. The valve 45 may be of any suitable type for serving the purpose, such as a manually operated pressure-reducing valve which is operated such as by means of suitable control lever 46. When this system is incorporated in an earth-working machine, the operator thereof may, with the illustrated embodiment, reduce the torque capacity of the torque converter in the drive train selectively at his option in order to have more power available from the engine to power the hydraulic system for operating the implements of the machine.

The operation of the FIG. 1 and FIG. 3 embodiment of the invention is believed to be apparent from the above description. However, the following explanation should ensure a clear understanding thereof. As will be appreciated from viewing FIG. 1 and FIG. 3, when the impeller of the torque converter is rotated at a reasonably high rate of speed, centrifugal force generated by its rotation acts on the pivotally mounted or movable impeller member 24, causing it to pivot about its axis 25 and move outward to increase the radius of the impeller means. The effective impeller comprising the fixed impeller blade 22 and the movable impeller blade 24 combine to perform the impeller function. The exit radius of the impeller member is defined by the outermost portion of the movable impeller member 24. Under the influence of centrifugal force the movable impeller member 24 will move upward until the projection 28 engages the stop surface 29. This engagement will depend upon the position of the member 30 which constitutes the movable stop means.

As will be appreciated from viewing FIG. 3, should the member 30 be moved further to the right in its fully retracted position, which may be accomplished in any suitable manner such as by means of a spring, not shown, the member 24 will be permitted to pivot outward under the centrifugal force of its maximum outermost position. Thus, the torque converter will then have its maximum torque capacity.

The operating position of the impeller element 24 determines the exit radius from which the power capacity of the impeller means 13 is obtained. This outward position, as explained above, is dependent upon the outer position of the stop member 30 and the stop face 29. Should the operator desire to reduce the torque output or capacity of the torque converter, he manipulates valve 45 for introducing fluid by way of conduit or passage means 34 into the pressure chamber 33 for moving piston 31 leftward and thus moving the face 29 which essentially operates as stop means for stopping the outward movement of the movable member 24. When the member 30 is moved outward to its outermost position, the movable impeller blade 24 stops in a position as shown in phantom and is thus in the minimum torque-capacity position.

For maximum torque capacity the member 30 is permitted to move to the right to its innermost position so that the pivotal or movable impeller blade 24 assumes the position as shown at 24, which defines its outermost position and thus the maximum torque capacity of the torque converter. The illustrated embodiment is found to provide a two-to-one change in the power capacity of the impeller.

Turning now to FIG. 2, there is illustrated an alternate embodiment which operates fully automatic. In this embodiment identical elements are identified by the same reference numeral, whereas functional equivalents are identified by the same reference numeral primed. In this embodiment the major point of distinction lies in the construction of the impeller unit. In this embodiment the impeller, indicated generally at 13', comprises a fixed impeller member 22' connected as in the previous embodiment to the rotary or impeller housing. A second portion of the impeller comprises a movable impeller blade 24' pivotally connected by suitable pivot means 25' to the fixed impeller member or blade 22'. Suitable means comprising an arm 26' and a spring 27' biases the movable impeller member 24' to its innermost position. The movable impeller member 24' is provided with suitable counterweight means indicated generally at 47, which functions under the influence of centrifugal force to force the impeller member 24' outward against the effect of spring 27'.

This embodiment, as explained above, operates fully automatic with the radius of the impeller member 24', gradually increasing as the rotational velocity thereof increases.

Turning now to FIG. 4, there is illustrated a view of a preferred construction of the impeller blade arrangement. As can be seen therein, the blade consists of two members, the first fixed member 22 and a second movable member 24 pivotally connected, such as to the first member. The fixed member 22 may be a casting integral with shroud walls 50, or it may be a separate member assembled with the hub and shroud walls into a composite unit.

The second member, as illustrated therein, has a range of positions indicated which define the exit radius of the blade 24. Also illustrated therein are the effective radius positions $R_2$ and $R_2'$ showing the range of positions for the blade. The flow path of the fluid within the torque converter itself is shown by the arrows so labeled.

Turning now to FIGS. 5 and 6, there is illustrated an end view of preferred constructions of the impeller blade. These blades, as shown in FIG. 5 and FIG. 6, show the pivoting blades to be radial and flat planes which pass through slots in shroud wall 50 into the fluid chamber of the housing. These blades are supported on pivots about which they rotate to change their positions, as best shown in FIG. 4.

The axial view of the blades as shown in FIG. 5 and FIG. 6 illustrates the possible relative positions of the two blades. The FIG. 5 example, for example, is preferred for fluid flow considerations as providing a smoother flow. On the other hand, the arrangement in FIG. 6 is preferred for structural support reasons since blade 24'' is at least partially supported by fixed blade 22'' during rotation. When the impeller is rotating in the direction shown by the arrows 48 in FIG. 5 and 49 in FIG. 6, the thrust of the movable blade 24 of the FIG. 5 embodiment tends to separate from the fixed blade 22. However, the blade 24'' in FIG. 6 is such that the thrust causes the blade 24'' to rest against the fixed blade 22''.

Other constructions are possible within the scope of the invention. For example, the entire blade may be pivotally mounted for radial movement. Thus, the power capacity would be changed by changing the position of the entire blade. Such a system, however, would have less change in capacity than a combined fixed and movable blade system.

We claim:

1. In a torque converter including a housing and having an input, an output, an impeller connected to said input, a turbine connected to said output, and a stator mounted within said housing, the improvement comprising:

means for varying the torque capacity of said torque converter, said means including means for varying the capacity of said impeller;

said impeller comprises a plurality of blades having a fixed inner portion and a variable-radius outer portion;

said means for varying the capacity of said impeller comprises means for varying the radii of the impeller blades; and, variable stop means engageable by said variable-radius outer portion to define the radius of said impeller.

2. The torque converter of claim 1 wherein:

said variable-radius outer portion comprises a blade member pivotally connected to said fixed inner member and operative to swing outward under the influence of centrifugal force when said impeller rotates; and spring means for biasing said blade member inward during non-rotation of said impeller.

3. The torque converter of claim 2 wherein said stop means includes a movable stop member having an arcuate face movable toward and away from the pivotal axis of said blade member and engageable by said pivotal blade member.

4. The torque converter of claim 2 wherein said variable-radius outer portion is ahead of said fixed inner portion in the direction of rotation of said impeller.

5. The torque converter of claim 1 wherein said variable-radius outer portion is behind said fixed inner portion in the direction of rotation of said impeller.

6. The torque converter of claim 2 wherein said variable impeller is capable of a two-to-one change in power capacity.

* * * * *